Figures 1, 3:
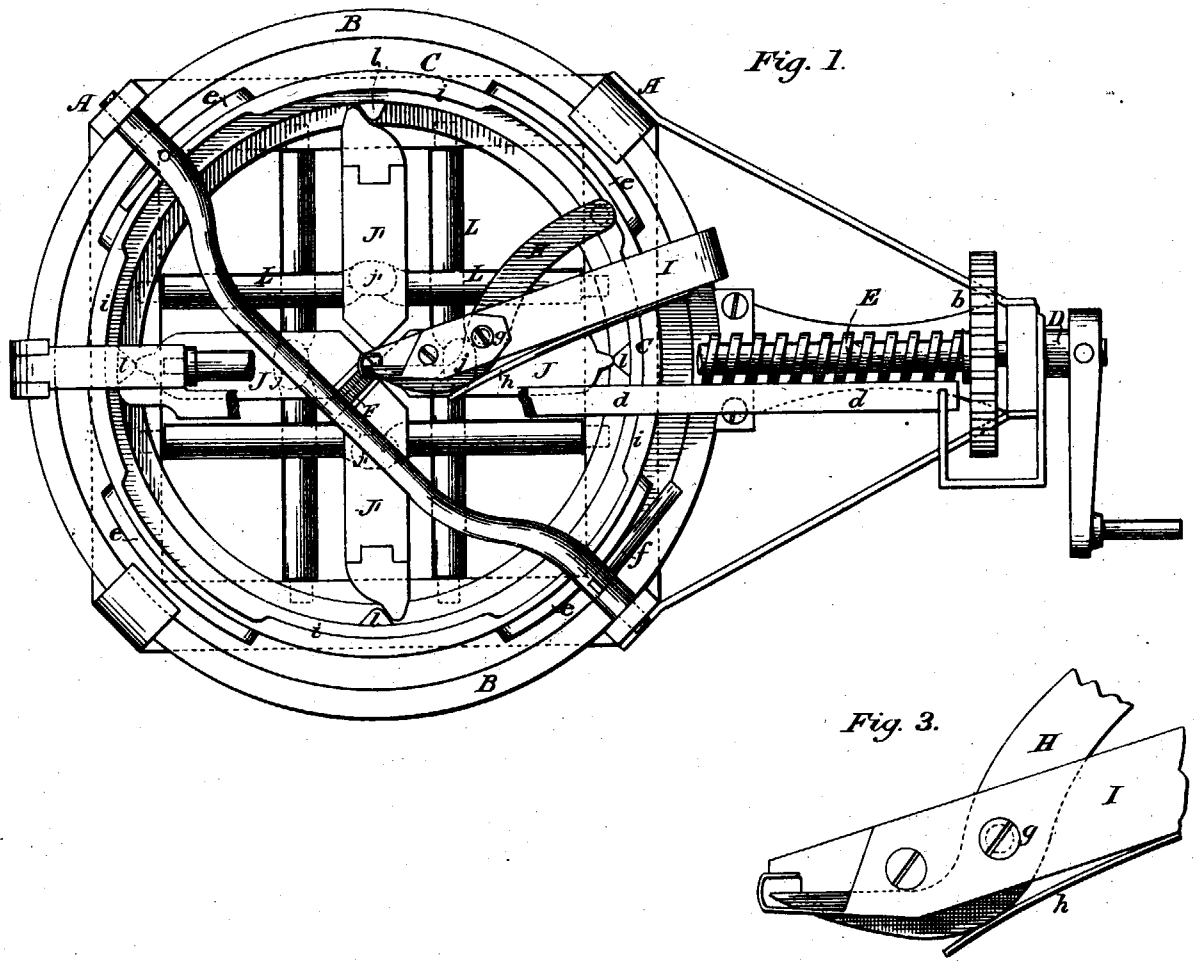

2 Sheets—Sheet 1.

H. A. WILLS,

Assignor to NATIONAL HORSE NAIL CO.

MACHINE FOR POINTING NAILS.

No. 9,838. Reissued Aug. 9, 1881.

Attest:
J. Eugene Smith
S. A. Steele

Inventor:
Harry A. Wills

N. PETERS, Photo-Lithographer, Washington, D. C.

2 Sheets—Sheet 2.
H. A. WILLS,
Assignor to NATIONAL HORSE NAIL CO.
MACHINE FOR POINTING NAILS.
No. 9,838. Reissued Aug. 9, 1881.
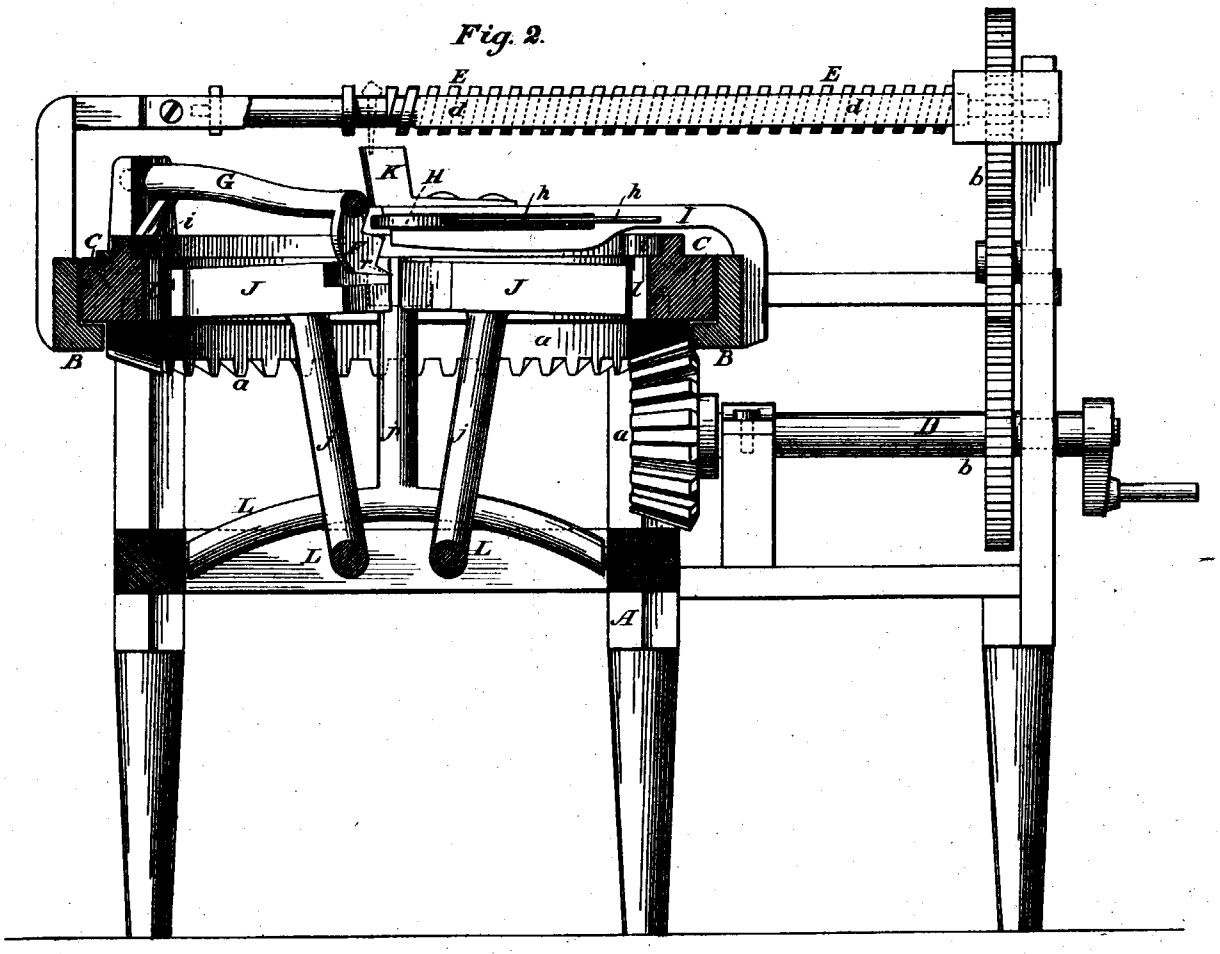
Attest:
J. Cuque Smith
S. A. Steele
Inventor:
Harry A. Wills
N. PETERS, Photo-Lithographer, Washington, D. C.

UNITED STATES PATENT OFFICE.

HARRY A. WILLS, OF CHICAGO, ILLINOIS, ASSIGNOR TO NATIONAL HORSE NAIL COMPANY, OF VERGENNES, VERMONT.

MACHINE FOR POINTING NAILS.

SPECIFICATION forming part of Reissued Letters Patent No. 9,838, dated August 9, 1881.

Original No. 109,987, dated December 6, 1870. Application for reissue filed October 7, 1880.

*To all whom it may concern:*

Be it known that I, HARRY A. WILLS, formerly of Vergennes, in the county of Addison and State of Vermont, but now of the city of Chicago, in the county of Cook and State of Illinois, assignor to the NATIONAL HORSE NAIL COMPANY, of Vergennes, in the county of Addison and State of Vermont, have invented a new and Improved Machine for Pointing Nails; and I do hereby declare that the following is a full, clear, and exact description of the invention, which will enable others skilled in the art to make and use the same, reference being had to the accompanying drawings, forming part of this specification, in which—

Figure 1 is a plan or top view of my improved nail-pointing machine. Fig. 2 is a vertical longitudinal section of the same, and Fig. 3 is an enlarged view of the clamping device.

Similar letters of reference indicate corresponding parts.

This invention relates to an improved machine for pointing the ends of nails used for horseshoes and other purposes.

The mechanism of this machine may be conveniently described under the following divisions, viz: first, feeding mechanism, which consists of devices by which the nail-blanks are conveyed to the stopping or gaging device; second, stopping or gaging mechanism, by which the nail-blanks are arrested or gaged from their points as they descend the feeding mechanism; third, clamping mechanism, by which the nail-blanks are held in position after the stopping or gaging mechanism has been withdrawn; and, fourth, pointing or beveling mechanism; and the invention consists in the combination of devices and mechanisms which make up the machine, as hereinafter more particularly described by reference to the accompanying drawings and claims.

By reference to the drawings, A represents the frame of the machine, upon which the operative mechanism is mounted.

B is an annular guide properly supported upon the frame A, and C is a circular frame, which is caused to rotate in the guide B.

D is a driving-shaft, mounted in the frame A, and connected by bevel or other gearing *a* with the frame C, so as to rotate the same.

The feeding mechanism consists of a revolving cylinder, E, having a spiral groove cut into its surface of sufficient width to receive the nail-blanks, and terminating in an enlargement above the center of the frame C, which permits the blanks to drop from the cylinder E. *d* is a stationary bar, passing alongside the cylinder E, at such distance therefrom as to permit the blanks to hang vertically in the groove of the cylinder with their heads resting upon the edge of this bar *d*. The feeding-cylinder E is revolved by its connection with the driving-shaft through the geared wheels *b b*. K is a vertical conductor, secured to the stationary arm I, and located below the groove enlargement on the cylinder E, and serves to direct the blanks when they drop from the feeding-cylinder, so that their points strike against and are arrested by the toe or point of the gage F when the same is thrown under the lower end of the conductor.

The stopping or gaging mechanism consists of a gage or stop, F, provided with a toe or projecting part, *r*, which is alternately brought under and out from under the lower end of the conductor K, and when under such conductor arrests the descent of the blanks at their points. This gage is secured to a rock-shaft, G, which is actuated by upwardly-projecting cams *e e*, &c., located near the outer circumference of the frame C, and by a spring, *f*, secured to the rock-shaft and to the stationary frame. The shaft G is bent, so that when it is rocked by the action of the cams the gage F will be moved downward as well as away from the center of the machine, so that the position of the points of the nail-blanks will not be disturbed by the withdrawal of the projecting part *r*.

The clamping mechanism consists of a clamp, H, a stationary arm, I, secured to the guide B or frame A of the machine, and a spring, *h*, and cams *i i*, &c., by which the clamp is operated. The clamp H is secured by a pivot, *g*, in a slot passing laterally through the arm I, so that the head or working part of the clamp is upon one side or under this arm, and the tail-piece upon the other side thereof. This tail-piece has a pin projecting downward, which rests against the vertical surface of a rabbet formed in the rotating frame C, and is provided with lateral cams *i i*, &c. The end of the arm I near the center of the machine is so shaped and located that as the blanks descend from the conductor and their points rest upon the gage F they will stand between the arm I on the one side and the working-face of the clamp on the other side. *h* is a spring, having one of its ends secured to the arm I, while its other end rests on the clamp H, and constantly forces its working-face toward the end of the arm I, so that whenever the clamp is free to act in that direction it will clamp the blanks against the end of the arm I. The operation of the cams *i i*, &c., is to force the tail-piece toward the center of the machine and swing the clamp upon its pivot *g*, which brings its working-face away from the end of the arm I and releases the clamped blank.

The pointing and beveling mechanism consists of hammers arranged in pairs to operate upon the edges and upon the sides of the blanks while they are held by the clamping mechanism. J J represent one pair of hammers arranged to operate upon the edges of the blanks, and J′ J′ represent a pair arranged to operate upon the sides of the blanks. The hammers are mounted upon arms *j* and *j′*, which project upwardly from rock-shafts mounted in the lower part of the frame A. These hammers are thrown forward toward the center of the machine by V-shaped arms *l l*, which project from the inner circumference of the frame C, and these arms are so located that the hammers of each pair strike the nail simultaneously, and so that the pair which operates to point or bevel the edge of the nail will strike it before the pair which operates upon its sides or faces. These hammers may be so hung upon their shafts that after they have delivered their blows they will drop back to their first position by their own weight.

The operation of this machine is briefly as follows: The nail-blanks are placed in the groove of the feeding-cylinder, between the cylinder and the bar *d*, and are by the revolution of the cylinder carried to the center of the machine, where they drop successively into the conductor K, and are by it directed upon the projecting part of the gage F, which is released from the cams *e e*, &c., and thrown forward by the spring *f* in time to arrest each descending blank at its point. While resting on the gage the blank is pressed against the arm I by the clamp H, and when thus clamped the gage is withdrawn from under the blank by the rocking of the shaft G by the cams *e e*, &c. The pairs of hammers J J and J′ J′ then act successively upon the blank to point or bevel the same, and the nail, when released from the clamp, drops through the machine, and another is deposited upon the gage.

It will be understood that the pitch of the groove and rate of revolution of the feeding-cylinder, and the location of the cams *e e*, &c., and *i i*, &c., and the arms *l l*, must be in such relation to each other that the operation of dropping, gaging, clamping, and pointing the blanks will be performed in their proper order and time of succession.

The machine can be used for hammering and stiffening nails, as well as for beveling their points. The gaging device is new, especially in so far as it gages from the point, gaging from the head being the common but less reliable practice.

What is claimed as new is—

1. In combination with a spirally-grooved feeding-cylinder of a nail-pointing machine, a vertical conductor to receive the blanks from the feeding-cylinder and direct them upon a gage, substantially as described.

2. In combination with a vertical feed-conductor of a nail-pointing machine, a stop or gage moving alternately under and out from under the feed-conductor, and gaging the nails from their points in relation to subsequent operating devices, substantially as set forth.

3. The combination, in a nail-pointing machine, of a stop to gage the nails from their points and mechanism to clamp and hold them vertically after the stop has been withdrawn and during subsequent operations of the machine, substantially as set forth.

4. In a nail-pointing machine, in combination with a stop to gage the nails from their points and mechanism to clamp them and hold them after the stop has been withdrawn, mechanism operating to stiffen or point the nails, substantially as set forth.

5. In a nail-pointing machine, in combination with a rotary frame provided with cams, a stop to gage the nails and a clamp to hold them, substantially as described.

HARRY A. WILLS.

Witnesses:
J. EUGENE SMITH,
S. A. STEELE.